June 10, 1930.  W. H. PALMER  1,763,253
MERCHANDISE WARMER
Filed Feb. 7, 1929
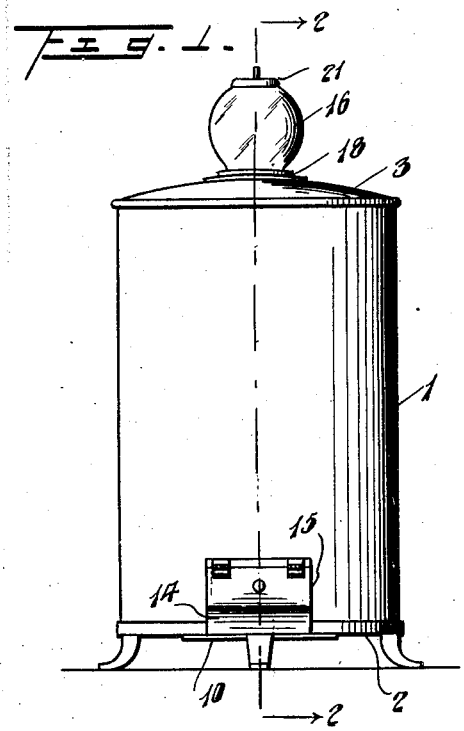
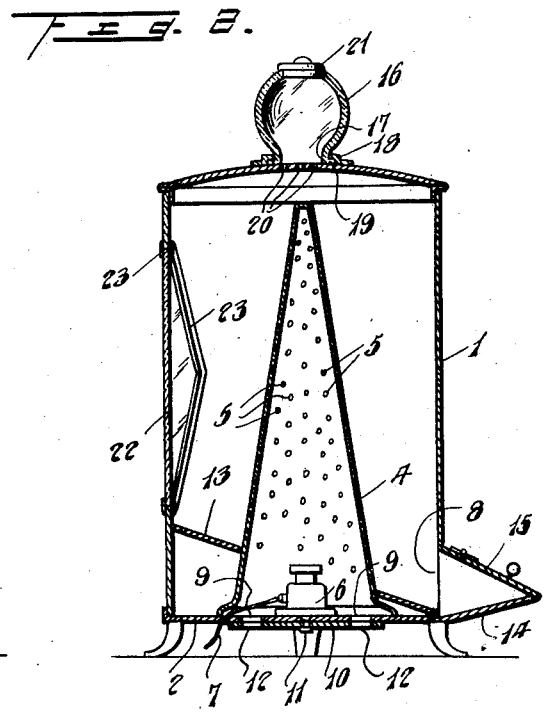
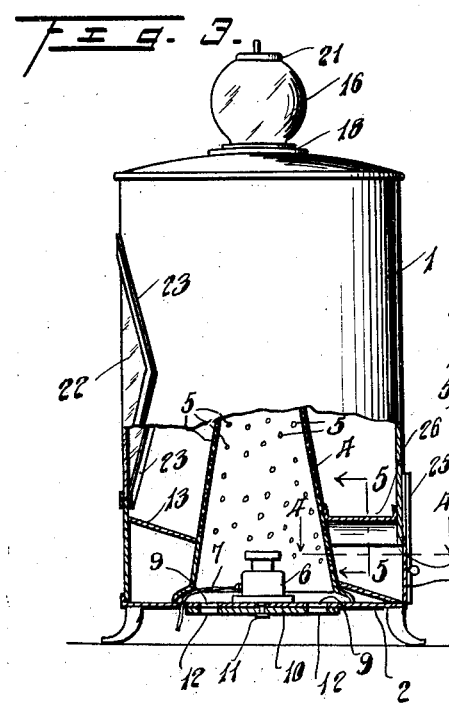
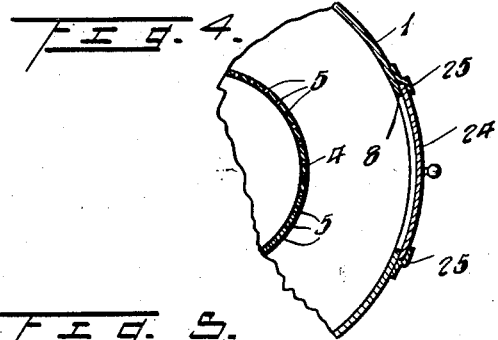
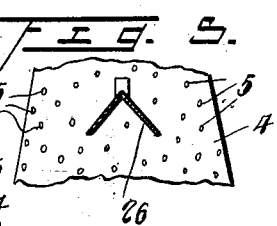
Inventor
W. H. Palmer.
By L. F. —————
Attorney Patented June 10, 1930

1,763,253

UNITED STATES PATENT OFFICE

WILLIAM H. PALMER, OF MONROVIA, INDIANA, ASSIGNOR OF ONE-HALF TO GEORGE L. DAVIDS, OF INDIANAPOLIS, INDIANA

MERCHANDISE WARMER

Application filed February 7, 1929. Serial No. 338,210.

The invention relates to devices for warming nuts, pop-corn, and the like, and has for its object the provision of a portable receptacle for holding the merchandise and provided with means for heating and warming the merchandise consisting of a perforated sheet metal cone for distributing the heat from the heater seated on the bottom of the receptacle within the cone, means being also provided for controlling the passage of heated air through the perforations in the cone comprising a ventilating valve located on the bottom of the receptacle within the cone.

The invention will be described in detail hereinafter and will be found illustrated in the accompanying drawings in which Figure 1 is a front view in elevation of the improved merchandise warmer, Figure 2 is a vertical sectional view on a plane indicated by the line 2—2 of Figure 1, Figure 3 is a side view partly broken away and in section of a modified construction of warmer, Figure 4 is a horizontal sectional detail on a plane indicated by the line 4—4 of Figure 3, and Figure 5 is a vertical sectional detail on a plane indicated by the line 5—5 of Figure 3.

In the drawings similar reference characters are used to designate corresponding parts throughout the several views.

The improved merchandise warmer comprises a receptacle that may be made of any suitable material such for instance as sheet metal and may be cylindrical as shown in the drawings or any other shape as desired, said receptacle having side walls 1, bottom 2, and its upper end open and closed by means of a flanged cover 3. Seated on the bottom 2 is a sheet metal cone 4 having a plurality of perforations 5 and enclosing a heating unit 6 which may be an electrical heater and supplied with current by means of a conductor 7 or it will be apparent that any other means for providing heat may be substituted. As shown in the drawings the cone 4 extends from the bottom 2 substantially to the top of the receptacle so that nuts, pop-corn, and the like that is inserted through the open upper end of the receptacle will be thoroughly heated while passing downwardly to the dispensing opening 8 by contact with the cone and radiation of heat therefrom and also by distribution of warm air from the interior of the cone through the perforations 5. The bottom 2 within the base of the cone 4 is provided with openings 9, and 10 designates a disk rotatably mounted on pin 11 and provided with openings 12 for controlling the passage of air through the openings 9 into the cone to permit circulation of the hot air through the perforations 5. 13 indicates a false bottom surrounding the cone 4 and inclined upwardly and rearwardly from the dispensing opening 8 and forming a chute to deliver the material contained in the space between the cone 4 and the side wall 1 through the delivery opening 8. 14 indicates a hopper communicating with the delivery opening 8 that is closed by a hinged door 15 for convenient dispensing of the material from the receptacle. 16 indicates another receptacle that is preferably made of glass and having its lower open end 17 secured by means of a clamping member 18 engaging a flange 19 to the cover 3, said receptacle 16 being adapted to hold merchandise such as shelled nuts and the like for warming, the cover 3 being provided with openings 20 communicating with the receptacle 16 for circulation of warm air from the main receptacle. 21 indicates a removable lid or cover for the receptacle 16. In order to display the contents of the main receptacle, a transparent panel 22 is provided and held within an opening cut in the side wall 1 by means of cleats 23.

In the modification shown in Figures 3, 4, and 5, the hopper 14 and hinged door 15 is dispensed with and the dispensing opening 8 is closed by means of a sliding door 24, 25 being guides for the sliding door, and to prevent the material within the receptacle from running out of the dispensing opening 8 when the door 24 is raised, a baffle 26 is provided that is angular as shown in Figure 5.

In using the device it will be apparent that the nuts, pop-corn, or the like, is inserted through the open upper end of the receptacle when the cover 3 is removed, and as the material is dispensed through the opening 8 other material is fed down by gravity and while within the receptacle is warmed by contact with or radiation from the cone 4 by the heat from the heating elements and also by circulation of warm air through the perforations 5 from the interior of the cone, it being apparent that as the space between the cone 4 and the side wall 1 is diminished from the top toward the bottom, the material will be subjected to more and more heat as it approaches the delivery opening.

What is claimed is:—

1. A merchandise warmer, comprising a receptacle, a sheet metal cone mounted on the base of the receptacle and spaced from its side walls providing a space for merchandise therebetween, said cone extending vertically through the receptacle, a heating element supported on the bottom of the receptacle within the cone and adapted to warm the cone and the merchandise within the receptacle, the top of the receptable being open, a removable cover closing the open top, and a dispensing opening in the side wall of the receptacle adjacent to its bottom.

2. A merchandise warmer, comprising a receptacle, a perforated sheet metal cone mounted on the base of the receptacle and spaced from its side walls providing a space for merchandise therebetween, said cone extending vertically through the receptacle, a heating element mounted within the cone, an adjustable valve in the bottom of the receptacle controlling ventilating openings communicating with the interior of the cone, the top of the receptacle being open, a removable cover closing the open top, a dispensing opening in the side wall of the receptacle adjacent to its bottom, and a false bottom in the receptacle and surrounding said cone, said false bottom being inclined upwardly and rearwardly from the dispensing opening.

3. A merchandise warmer, comprising a receptacle, a perforated sheet metal cone mounted on the base of the receptacle and spaced from its side walls providing a space for merchandise therebetween, said cone extending vertically through the receptacle, a heating element mounted within the one on the base of the receptacle, the base of the receptacle within the cone provided with a ventilating opening, a disk rotatably mounted on the receptacle base and provided with an opening adapted to register with the opening in the base, said disk being rotatable to close the opening in the base, the top of the receptacle being open, a removable cover for the open top of the receptacle, a receptacle on the cover for other merchandise, the cover provided with perforations communicating with said last mentioned receptacle for the passage of heated air to said receptacle, a dispensing opening in the side wall of the first mentioned receptacle adjacent to the base thereof, and a false bottom in the receptacle and surrounding said cone, said false bottom being inclined upwardly and rearwardly from the dispensing opening.

In witness whereof I affix my signature.

WILLIAM H. PALMER.